United States Patent
Liang et al.

(10) Patent No.: US 10,411,491 B2
(45) Date of Patent: Sep. 10, 2019

(54) CHARGING METHOD AND ELECTRONIC DEVICE USING THE SAME

(71) Applicant: Wistron Corporation, New Taipei (TW)

(72) Inventors: Chen-Yi Liang, New Taipei (TW); Yao-Tsung Chang, New Taipei (TW)

(73) Assignee: Wistron Corporation, New Taipei (TW)

( * ) Notice: Subject to any disclaimer, the term of this patent is extended or adjusted under 35 U.S.C. 154(b) by 80 days.

(21) Appl. No.: 15/822,214

(22) Filed: Nov. 27, 2017

(65) Prior Publication Data

US 2019/0020201 A1 Jan. 17, 2019

(30) Foreign Application Priority Data

Jul. 14, 2017 (TW) ............................ 106123624 A

(51) Int. Cl.
*H02J 7/00* (2006.01)

(52) U.S. Cl.
CPC ............ *H02J 7/007* (2013.01); *H02J 7/0042* (2013.01); *H02J 7/0047* (2013.01); *H02J 7/0073* (2013.01); *H02J 2007/005* (2013.01)

(58) Field of Classification Search
CPC ................................ H02J 7/007; H02J 7/0042
USPC ....................................................... 320/155
See application file for complete search history.

(56) References Cited

U.S. PATENT DOCUMENTS

| | | | |
|---|---|---|---|
| 7,336,054 B2 * | 2/2008 | Crisp | H02J 7/0006 320/106 |
| 8,305,045 B2 | 11/2012 | Maeagawa | |
| 8,497,662 B2 * | 7/2013 | Aradachi | H01M 10/4221 320/106 |
| 8,970,176 B2 * | 3/2015 | Ballatine | H02J 1/102 307/11 |
| 9,024,574 B2 * | 5/2015 | Culp | H02J 7/0073 320/107 |
| 9,520,728 B2 * | 12/2016 | Touchton | H02J 7/0042 |
| 9,627,903 B2 * | 4/2017 | Schwartz | H02J 7/0052 |
| 9,906,062 B2 * | 2/2018 | Terlizzi | H02J 7/0004 |
| 2013/0154575 A1 * | 6/2013 | Takahashi | H01M 10/44 320/155 |
| 2019/0126775 A1 * | 5/2019 | Han | G05B 19/418 |

FOREIGN PATENT DOCUMENTS

| | | |
|---|---|---|
| CN | 105207288 | 12/2015 |
| TW | 201642210 A | 12/2016 |

* cited by examiner

*Primary Examiner* — M Baye Diao
(74) *Attorney, Agent, or Firm* — Winston Hsu

(57) ABSTRACT

A charging method for an electronic device comprising a battery for supplying power, the method comprises obtaining an allowable charging time and a remaining electricity information of the battery when the electronic device connects to a charger; determining a charging procedure according to the allowable charging time and the remaining electricity information; and performing the charging procedure to charge the battery with the charger; wherein the allowable charging time is a period of time that the electronic device is capable of being charged.

22 Claims, 4 Drawing Sheets

CHARGING METHOD AND ELECTRONIC DEVICE USING THE SAME

BACKGROUND OF THE INVENTION

1. Field of the Invention

The present invention relates to a charging method and electronic device, and more specifically, to a charging method and electronic device for determining a charging procedure according to the instruction of a user.

2. Description of the Prior Art

With the evolution of the technology, the chances to make use of portable devices (e.g. laptops, smart phones, cameras) in daily lives have substantially increased. For the conveniences of the users to carry along, most of the portable devices are equipped with chargeable batteries which store electricity to supply electricity power for operations of the portable devices.

A chargeable battery is an energy storage device that may repeatedly perform charging and discharging. The conventional charging technology includes constant-current, constant-voltage, etc. In addition, due to the ever increasing requirements of the users for the charging time, the prior art has provided a fast charging mode to fully charge the battery of the electronic device within a short period of time. Although the fast charging mode provides the time saving convenience to the users, the fast charging mode can generate rapid temperature rise during the charging procedure, which may lead to damages to the battery. The worst scenario may endanger the safety of the user. In comparison, the normal charging mode may charge the electronic devices more safely without damaging the battery, but the normal charging mode is not able to meet the requirements when the users need to fast charge in a short period of time.

In addition, when the user is operating the electronic device, the user may frequently encounter the situation that need to further restrict the using time of the electronic device. For example, parents may need to restrict their kids of their time on using the electronic devices, the public places may need to restrict using time on the free charging devices, etc. However, the conventional charging technology does not provide a charging procedure according to the requirements of the user for the using time.

Therefore, how to perform a charging procedure according to the requirements of the user for the charging time or the using time of the electronic device, so as to meet the user's requirements, has become a significant objective in the field.

SUMMARY OF THE INVENTION

It is therefore a primary objective of the present invention to provide a charging method and an electronic device for properly performing the charging procedure according to the requirements of the user to the charging time and the using time of the electronic device.

The present invention discloses a charging method for an electronic device comprising a battery for supplying power. The charging method comprises obtaining an allowable charging time and a remaining electricity information of the battery when the electronic device connects to a charger; determining a charging procedure according to the allowable charging time and the remaining electricity information; and performing the charging procedure to charge the battery with the charger; wherein the allowable charging time is a period of time that the electronic device is capable of being charged.

The present invention further discloses an electronic device. The electronic device comprises an operational circuit; a battery, for supplying power to the operational circuit; a connecting interface, for connecting to a charger; and a charging device, comprising an information acquisition module, for obtaining an allowable charging time and a remaining electricity information of the battery when the connecting interface connects to the charger; a logic module, for determining a charging procedure according to the allowable charging time and the remaining electricity information; and a charging module, for charging the battery according to the charging procedure with the charger; wherein the allowable charging time is a period of time that the electronic device is capable of being charged.

These and other objectives of the present invention will no doubt become obvious to those of ordinary skill in the art after reading the following detailed description of the preferred embodiment that is illustrated in the various figures and drawings.

DETAILED DESCRIPTION

In general, an electronic device is charged through the connection to a charging device (e.g. a power bank, a transformer, a charger, etc.). When charging the electronic device, a user may charge the electronic device under a charging speed provided by the charging device, but the charging mode provided by the charging device is not able to adapt to the requirements of the user. Under such a circumstance, the present invention provides an electronic device which is capable of adjusting the charging mode to charge the electronic device according to the requirements of the user for the charging time.

Figure 1:
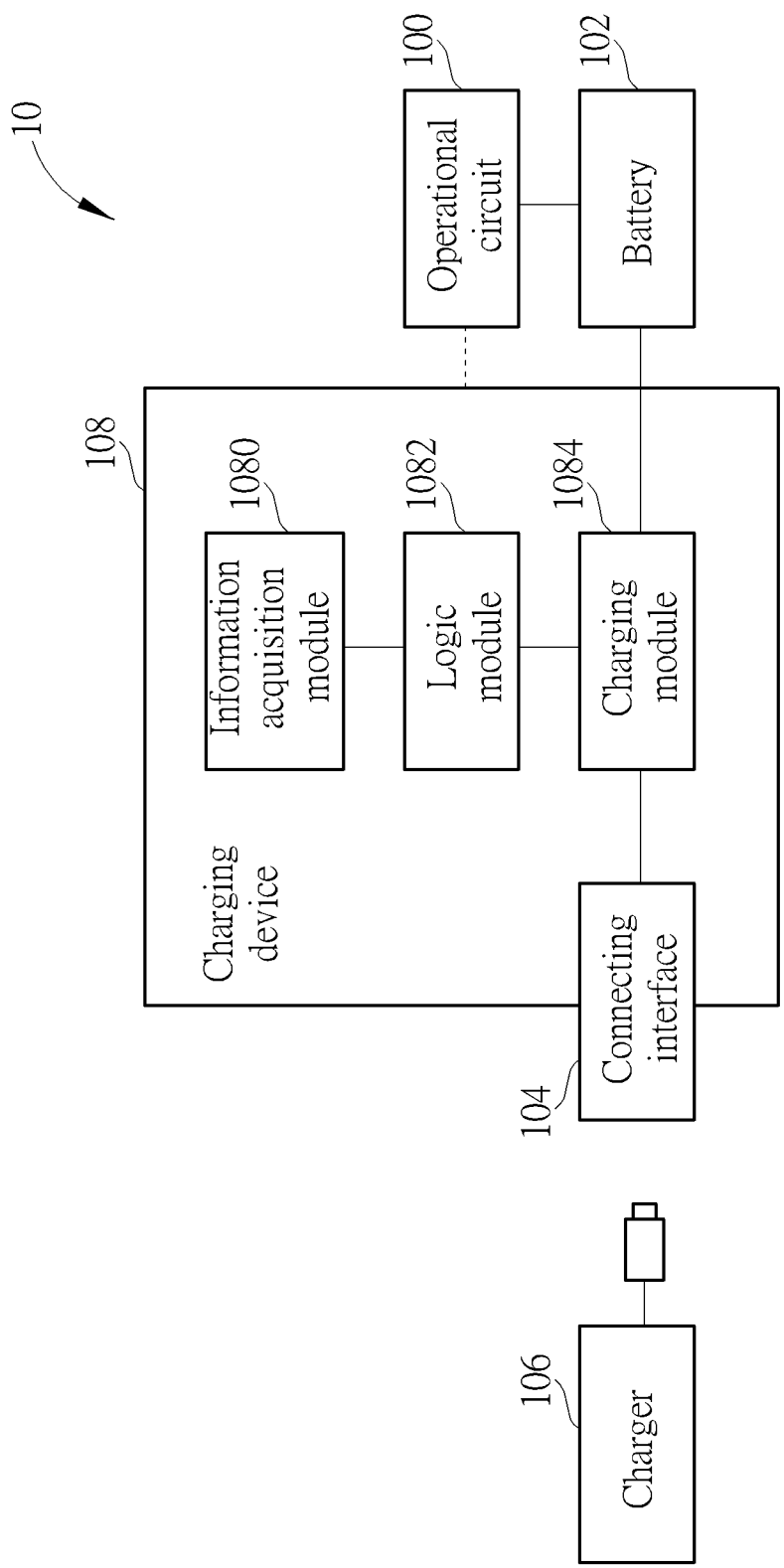
FIG. 1 is a schematic diagram of an electronic device according to an embodiment of the present invention.

Please refer to FIG. 1, which is a schematic diagram of an electronic device 10 according to an embodiment of the present invention. The electronic device 10 comprises an operational circuit 100, a battery 102, a connecting interface 104 and a charging device 108. The operational circuit 100 is a simple representation of the operational core of the electronic device 10, which may have a variety of compositions in response to different electronic devices. The battery 102 is coupled to the operational circuit 100, utilized for supplying power for the operational circuit 100 to operate the system. The charging device 108 is disposed between the connecting interface 104 and the battery 102, which may properly charge the battery 102 according to the requirements of the user when a charger 106 connects to the connecting interface 104.

More specifically, the charging device 108 comprises an information acquisition module 1080, a logic module 1082 and a charging module 1084. The information acquisition module 1080 is used for obtaining an allowable charging time and a remaining electricity information of the battery 102 when the connecting interface 104 connects to the charger 106. The logic module 1082 is coupled to the information acquisition module 1080 and the charging module 1084, for determining a charging procedure according to the allowable charging time and the remaining electricity information obtained by the information acquisition module 1080. The charging module 1084 is utilized for charging the battery 102 with the charger 106 according to the charging procedure determined by the logic module 1082. The allowable charging time is a period of time decided and indicated by the user for charging the electronic device 10, and the remaining electricity information is the electricity remained in the battery 102 of the electronic device 10.

Figure 2:
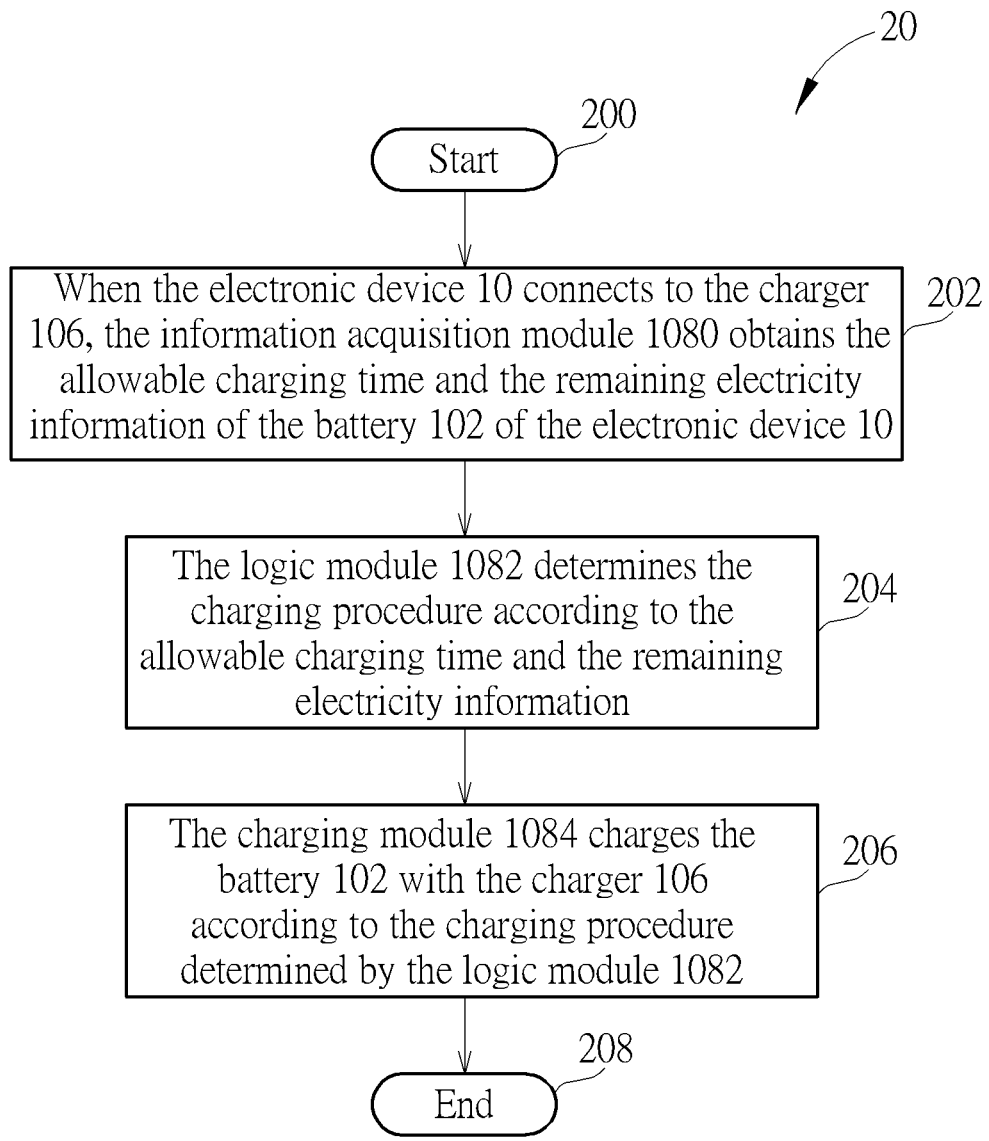
FIG. 2 is a schematic diagram of a charging process according to an embodiment of the present invention.

In other words, the electronic device 10 is capable of determining the charging procedure according to the requirements of the user for the charging time, so as to meet the user's requirements and perform charging on the battery 102. The operating procedures of the electronic device 10 can be summarized into a charging process 20, as shown in FIG. 2. The charging process 20 comprises the following steps:

Step 200: Start.

Step 202: When the electronic device 10 connects to the charger 106, the information acquisition module 1080 obtains the allowable charging time and the remaining electricity information of the battery 102 of the electronic device 10.

Step 204: The logic module 1082 determines the charging procedure according to the allowable charging time and the remaining electricity information.

Step 206: The charging module 1084 charges the battery 102 with the charger 106 according to the charging procedure determined by the logic module 1082.

Step 208: End.

In detail, in the embodiment, when the user intends to charge the electronic device 10 (i.e. connecting the charger 106 to the connecting interface 104), the requirements of the user for the period of charging time and the remaining electricity of the battery 102 of the electronic device 10 both affect the decision of the electronic device 10 on the charging procedure. In an embodiment, if the allowable charging time is short and the remaining electricity is low, the electronic device 10 may determine the charging procedure which charges the battery 102 fast with a large current, so as to quickly charge the electronic device 10. On the contrary, if the allowable charging time is long and the remaining electricity is high, the electronic device 10 may determine the charging procedure which charges the battery 102 slowly with a small current, so as to protect the electronic device 10. Therefore, when the electronic device 10 connects to the charger 106, the information acquisition module 1080 obtains the allowable charging time and the remaining electricity information in advance. The allowable charging time is instructed by the user, e.g. through the user's operation on an input menu displayed on a screen of the electronic device 10 or through the user's operation on buttons disposed on the charger 106, which is not limited herein. For example, when the operational circuit 100 of the electronic device 10 comprises a touch panel, the information acquisition module 1080 is capable of displaying an input menu on the touch panel for the user to input the estimated allowable charging time after the electronic device 10 connects to the charger 106. Or, when the charger 106 comprises buttons for obtaining specific allowable charging period of time (e.g. 30 minutes, 1 hour, over 1 hour, etc.), the user is also able to press the buttons of the charger 106 to select the specific allowable charging period of time, which is also within the scope of the present invention and is not limited herein. In addition, the information acquisition module 1080 may access a calendar scheduled by the user. That is, when the electronic device 10 connects to the charger 106, the information acquisition module 1080 obtains the schedule arrangements in the calendar of the user to further determine the available time of the user, so as to obtain the allowable charging time. For example, when the electronic device 10 connects to the charger 106 and the schedule in the calendar of the user indicates an hour of available time, the information acquisition module 1080 is able to determine that the allowable charging time is approximately an hour. Furthermore, the information acquisition module 1080 may directly sense the electricity of the battery 102 or obtain the electricity of the battery 102 through the charging module 1084 which is coupled to the battery 102, so as to obtain the remaining electricity information of the battery 102.

After the information acquisition module 1080 obtains the allowable charging time and the remaining electricity information of the battery 102, the logic module 1082 may accordingly evaluate a calculated current, which is a charging current for charging the battery 102 from the remaining electricity to the full capacity within the allowable charging time. Furthermore, the logic module 1082 is able to choose the charging procedure according to the calculated current to charge the battery 102 from the remaining electricity to the full capacity within the allowable charging time. However, it is noted that with a higher charging current, damage to the battery 102 and temperature rising of the electronic device 10 are severer. Therefore, in an embodiment, before performing the charging procedure according to the calculated current, the logic module 1082 compares the calculated current with a maximum charging current affordable by the electronic device 10. When the calculated current is larger than or equal to the maximum charging current, the logic module 1082 selects a fast charging mode and charges the electronic device 10 with the maximum charging current. In other words, the current of the fast charging mode is smaller than or equal to the maximum charging current which the battery 102 may sustain, so as to protect the electronic device 10.

At last, the charging module 1084 charges the battery 102 with the charger 106 according to the charging procedure determined by the logic module 1082. In an embodiment, the charging mode determined by the logic module 1082 may be selected from a group consisting of a pre-charge mode, a constant-current mode and a constant-voltage mode. For example, when the logic module 1082 determines to charge with a normal charging mode, the charging module 1084 may select the group composed of the constant-current mode and the constant-voltage mode to charge the battery 102. That is, the charging module 1084 charges the battery 102 according to the calculated current with the constant-current mode. When the voltage of the battery 102 becomes stable, the charging module 1084 would switch to the constant-voltage mode to perform charging. When the logic module 1082 determines to charge with the fast charging mode, the logic module 1082 may select the group composed of the pre-charge mode, the constant-current mode and the constant-voltage mode to charge the battery 102. For example, when the voltage of the battery 102 is smaller than a predetermined voltage, the charging module 1084 may perform the pre-charge mode to charge the battery 102 with a predetermined current under the constant-current mode. When the voltage of the battery 102 is larger than the predetermined voltage, the charging module 1084 charges the battery 102 with a maximum charging current under the constant-current mode. When the voltage of the battery 102 is stable, the charging module 1084 performs the charging under the constant-voltage mode.

Notable, when the logic module 1082 determines to charge battery 102 under the fast charging mode but unable to charge the battery 102 to its full capacity within the allowable charging time, the logic module 1082 may display related information to the user through the screen of the electronic device 10, e.g. "The available time is insufficient to fully charge." Meanwhile, the logic module 1082 may inform the user that the charging procedure is able to charge the battery 102 to a specific battery capacity (e.g. "able to charge to 50% of the battery capacity") or to a specific using time (e.g. "able to charge to 5 hours of standby time") within the allowable charging time.

In brief, when the electronic device 10 of the present invention performs charging with the charging process 20, the electronic device 10 may select a preferable charging procedure according to the allowable charging time instructed by the user, so as to meet the requirements of the user for the allowable charging time. Under such a circumstance, when the allowable charging time instructed by the user is urgent, the electronic device 10 may perform the charging procedure with the fast charging mode. When the allowable charging time instructed by the user is long, the electronic device 10 may perform the charging procedure with the normal charging mode, which is safer. Therefore, the charging device 108 may determine appropriate charging modes according to the requirements of the user.

In the prior art, the electronic device can only charge the battery according to a fixed charging mode. In comparison, the embodiments of the present invention may determine the charging mode according to the requirements of the user for the allowable charging time. Therefore, the electronic device 10 is able to charge quickly under the fast charging mode while the user is urgent, and charge safely under the normal charging mode while the allowable charging time of the user is not urgent.

Figure 3:
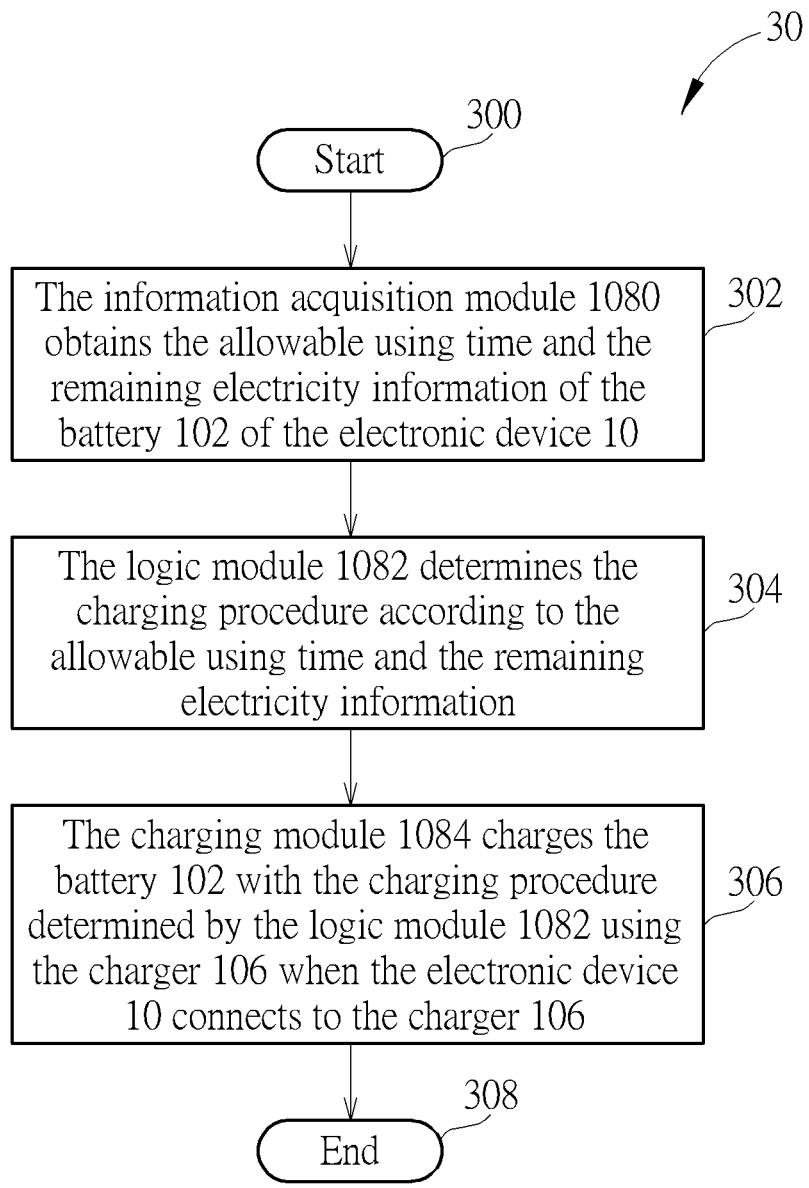
FIG. 3 is a schematic diagram of a charging process according to another embodiment of the present invention.

In addition, when the user is operating the electronic device, the user may have to further restrict the using time of the electronic device. Under such a circumstance, the present invention further determines the charging procedure according to the requirements of the user for the using time. Please refer to FIG. 3, which is a schematic diagram of a charging process 30 according to another embodiment of the present invention. The charging process 30 may be performed by the electronic device 10, so as to determine the charging procedure according to the using time. The charging process 30 comprises the following steps:

Step 300: Start.

Step 302: The information acquisition module 1080 obtains the allowable using time and the remaining electricity information of the battery 102 of the electronic device 10.

Step 304: The logic module 1082 determines the charging procedure according to the allowable using time and the remaining electricity information.

Step 306: The charging module 1084 charges the battery 102 with the charging procedure determined by the logic module 1082 using the charger 106 when the electronic device 10 connects to the charger 106.

Step 308: End.

The charging process 30 performs the charging according to the using time of the electronic device 10 estimated by the user. Therefore, the determination of the charging procedure is dependent to the allowable using time and the remaining electricity information. More specifically, the information acquisition module 1080 obtains the allowable using time instructed by the user and determines the remaining electricity information in advance. Then, the logic module 1082 determines electricity (of the battery 102) corresponding to the allowable using time, and determines the charging procedure according to the difference between the electricity corresponding to the allowable using time and the remaining electricity information of the battery 102. In other words, the logic module 1082 estimates how much electricity may be consumed by the electronic device 10 for operating under a predetermined mode for the allowable using time. And the logic module 1082 determines the charging procedure according to the comparison between the estimated electricity for the allowable using time and the remaining electricity of the battery 102. If the estimated electricity is greater than the remaining electricity of the battery 102, representing that the electronic device 10 is not able to operate for the allowable using time under the predetermined mode, the logic module 1082 determines the charging procedure to perform the charging. If the estimated corresponding electricity is smaller than or equal to the remaining electricity of the battery 102, representing that the electronic device 10 is able to operate for the allowable using time under the predetermined mode, the logic module 1082 determines not to perform any charging procedure.

At last, when the electronic device 10 connects to the charger 106, the charging module 1084 charges the battery 102 with the charging procedure determined by the logic module 1082. The charging mode may be selected from a group consisting of a pre-charge mode, a constant-current mode and a constant-voltage mode. For example, when the voltage of the battery 102 is smaller than a predetermined voltage, the charging module 1084 may perform the pre-charge mode in advance to charge the battery 102 with a predetermined current under the constant-current mode until the voltage of the battery 102 is greater than the predetermined voltage. The charging module 1084 raises the charging current to charge the battery 102 under the constant-current mode until the voltage of the battery 102 is stable. Then, the charging module 1084 switches to the constant-voltage mode.

In brief, when the electronic device 10 of the present invention performs charging according to the charging process 30, the electronic device 10 may select a preferable charging procedure according to the allowable using time, so as to meet the requirements of the user for the allowable using time. Under such a circumstance, the electronic device 10 is able to properly adjust and determine the charging procedure to charge the battery 102 to the electricity corresponding to the allowable using time inputted by the user, so as to meet the user's requirements.

In prior art, various charging devices may only adjust the charging speed and may not adjust the charging electricity according to the requirements of the user for the allowable using time. In comparison, the present invention is able to determine the charging procedure according to the allowable using time inputted by the user to charge the battery to the corresponding electricity. As a result, the present invention is able to restrict the allowable using time of the electronic device with the charged electricity, so as to meet the user's requirements.

Notably, the embodiments stated in the above are utilized for illustrating the concept of the present invention. Those skilled in the art may make modifications and alterations accordingly, and not limited herein. For example, when the user is operating the electronic device 10, the requirements of the user to the allowable charging time and the allowable using time are not single and limited but simultaneous and open. In other words, the user may need to charge the electronic device to a specific electricity capacity within a limited period of time. Therefore, the electronic device 10 may further determine and perform the charging procedure according to the allowable charging time and the allowable using time inputted by the user at the same time, which is also within the scope of the present invention. In other words, when the electronic device 10 connects to the charger 106 (i.e. the electronic device 10 connects to the connecting interface 104), the information acquisition module 1080 obtains the allowable charging time, the allowable using time and the remaining electricity information of the battery 102 of the electronic device 10. Then, the logic module 1082 determines the charging procedure according to the allowable charging time, the allowable using time and the remaining electricity information. At last, the charging module 1084 charges the battery 102 with the charger 106 under the charging procedure.

Moreover, in the embodiments stated in the above, the charger 106 provides a power source for charging the electronic device 10, and may be a power bank, a transformer or a desktop computer as long as the charger 106 provides the suitable power source for charging the electronic device 10. In addition, the charging device 108 provides a connection between the charger 106 and the battery 102 for obtaining time information inputted by the user and the remaining electricity information of the battery 102 to accordingly determine the charging procedure. The charging device 108 may be integrally included in the charger 106, appended to the operational circuit 100, or to be an external interface independent from the operational circuit 100 and the charger 106, as long as the charging device 108 is able to connect the charger 106 and the battery 102 to obtain the time information from the user and the remaining electricity information, so as to determine and perform the charging procedure.

Figure 4A:
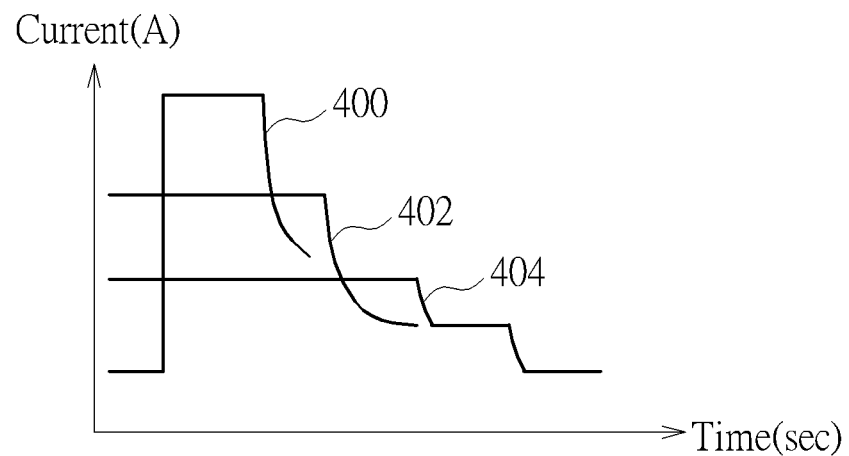
FIG. 4A is a schematic diagram of current versus time according to the embodiment of the present invention.
Figure 4B:
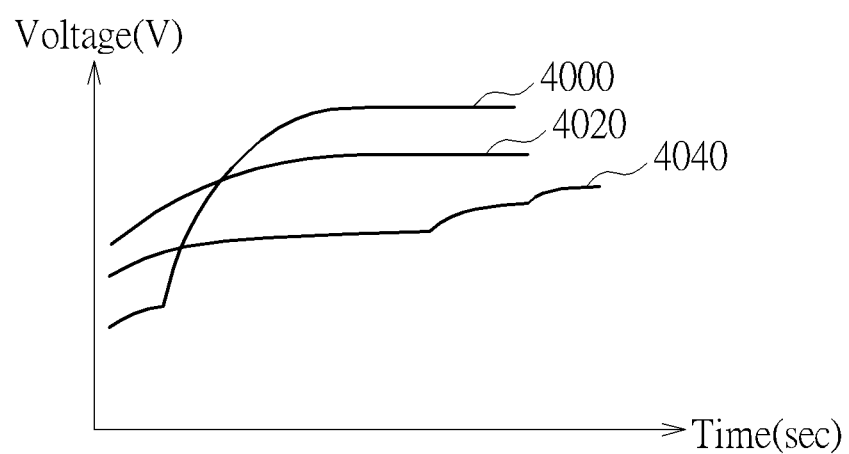
FIG. 4B is a schematic diagram of voltage versus time according to the embodiment of the present invention.

Furthermore, the charging procedures executed by the charging module 1084 may further include recursive charging modes despite the normal charging mode and the fast charging mode. Please refer to FIG. 4A and FIG. 4B, which are schematic diagrams of voltage and current versus time according to the embodiment of the present invention. A curve 400, a curve 402 and a curve 404 respectively illustrate charging currents of the fast charging mode, the normal charging mode and the recursive charging mode over time according to embodiments of the present invention. A curve 4000, a curve 4020 and a curve 4040 respectively illustrate charging voltages corresponding to the curve 400, the curve 402 and the curve 404 over time. To be more specific, as shown in the curve 404 and the curve 4040, when performing the recursive charging mode, the charging module 1084 charges the battery 102 with a constant current under the constant-current mode in advance. When the voltage of the battery 102 saturates, the charging module 1084 does not switch to the constant-voltage mode. Instead, the charging module 1084 continues to charge the battery 102 with a modified current under the constant-current mode, so as to efficiently increase the electricity of the battery 102 without saturating the voltage of the battery 102.

In the prior art, the charging device cannot properly adjust the charging mode according to the charging time required by the user and/or the using time required by the user. In comparison, the present invention is capable of properly determining and performing the charging procedure according to the charging time requirements of the user. Therefore, the charging device may perform fast charging when the user is urgent and perform safe charging when the user is not urgent and the allowable charging time is long. Moreover, the present invention is also capable of performing proper charging procedure according to requirements of the user for the using time of the electronic device, so as to restrict the allowable using time of the electronic device by the electricity charged.

In summary, the present invention may adaptably determine and perform the charging procedure to meet the requirements of the user for the charging time and the using time, so as to improve the conveniences.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A charging method for an electronic device comprising a battery for supplying power and a charging device, wherein the charging device comprises an information acquisition module, a logic module, and a charging module, the charging method comprising:
   obtaining, by the information acquisition module, an allowable charging time and a remaining electricity information of the battery when the electronic device connects to a charger;
   determining, by the logic module, a charging procedure according to the allowable charging time and the remaining electricity information; and
   performing, by the charging module, the charging procedure to charge the battery with the charger;
   wherein the allowable charging time is a period of time that the electronic device is capable of being charged.

2. The charging method of claim 1, wherein the step of obtaining the allowable charging time is receiving an instruction outputted by a user to obtain the allowable charging time.

3. The charging method of claim 1, wherein the step of determining the charging procedure according to the allowable charging time and the remaining electricity information is determining the charging procedure which is capable of charging the battery to a specific state within the allowable charging time according to the allowable charging time and the remaining electricity information.

4. The charging method of claim 3, wherein the specific state is the battery having enough electricity for supplying the electronic device to operate a predetermined time.

5. The charging method of claim 1, wherein the step of determining the charging procedure according to the allowable charging time and the remaining electricity information is selecting a charging mode from a plurality of charging modes according to the allowable charging time and the remaining electricity information, so as to determine the charging procedure, wherein the charging mode is capable of charging the battery to a specific state within the allowable charging time.

6. The charging method of claim 5, wherein the specific state is the battery having enough electricity for supplying the electronic device to operate a predetermined time.

7. The charging method of claim 5, wherein the plurality of charging modes are selected from a group consisting of a pre-charge mode, a constant-current mode and a constant-voltage mode.

8. An electronic device comprising:
an operational circuit;
a battery, for supplying power to the operational circuit;
a connecting interface, for connecting to a charger; and
a charging device, comprising:
   an information acquisition module, for obtaining an allowable charging time and a remaining electricity information of the battery when the connecting interface connects to the charger;
   a logic module, for determining a charging procedure according to the allowable charging time and the remaining electricity information; and
   a charging module, for charging the battery according to the charging procedure with the charger;
wherein the allowable charging time is a period of time that the electronic device is capable of being charged.

9. The electronic device of claim 8, wherein the information acquisition module receives an instruction outputted by a user to obtain the allowable charging time.

10. The electronic device of claim 8, wherein the logic module determines the charging procedure which is capable of charging the battery to a specific state within the allowable charging time according to the allowable charging time and the remaining electricity information.

11. The electronic device of claim 10, wherein the specific state is the battery having enough electricity for supplying the electronic device to operate a predetermined time.

12. The electronic device of claim 8, wherein the logic module selects a charging mode from a plurality of charging modes according to the allowable charging time and the remaining electricity information, so as to determine the charging procedure, wherein the charging mode is capable of charging the battery to a specific state within the allowable charging time.

13. The electronic device of claim 12, wherein the specific state is of the battery having enough electricity for supplying the electronic device to operate a predetermined time.

14. The electronic device of claim 12, wherein the plurality of charging modes are selected from a group consisting of a pre-charge mode, a constant-current mode and a constant-voltage mode.

15. A charging method for an electronic device comprising a battery for supplying power and a charging device, wherein the charging device comprises an information acquisition module, a logic module, and a charging module, the method comprising:
   obtaining, by the information acquisition module, an allowable using time and a remaining electricity information of the battery;
   determining, by the logic module, a charging procedure according to the allowable using time and the remaining electricity information; and
   performing, by the logic module, the charging procedure with a charger to charge the battery when the electronic device connects to the charger;
wherein the allowable using time is a period of time that the electronic device is capable of providing a specific operation.

16. The charging method of claim 15, wherein the step of obtaining the allowable using time is receiving an instruction outputted by a user to obtain the allowable using time.

17. The charging method of claim 15, wherein determining the charging procedure according to the allowable using time and the remaining electricity information is selecting a charging mode from a plurality of charging modes according to the allowable using time and the remaining electricity information, so as to determine the charging procedure, wherein the charging mode is capable of charging the battery to a specific state within a specific duration of time.

18. The charging method of claim 17, wherein the plurality of charging modes are selected from a group consisting of a pre-charge mode, a constant-current mode and a constant-voltage mode.

19. An electronic device comprising:
an operational circuit;
a battery, for supplying power to the operational circuit;
a connecting interface, for connecting to a charger; and
a charging device, comprising:
   an information acquisition module, for obtaining an allowable using time and a remaining electricity information of the battery;
   a logic module, for determining a charging procedure according to the allowable using time and the remaining electricity information; and
   a charging module, for performing the charging procedure with a charger to charge the battery when the electronic device connects to the charger;
wherein the allowable using time is a period of time that the electronic device is capable of providing a specific operation.

20. The electronic device of claim 19, wherein the step of obtaining the allowable using time is receiving an instruction outputted by a user to obtain the allowable using time.

21. The electronic device of claim 19, wherein determining the charging procedure according to the allowable using time and the remaining electricity information is selecting a charging mode from a plurality of charging modes according to the allowable using time and the remaining electricity information, so as to determine the charging procedure, wherein the charging mode is capable of charging the power of the battery to specific state within a specific duration of time.

22. The electronic device of claim 21, wherein the plurality of charging modes are selected from a group consisting of a pre-charge mode, a constant-current mode and a constant-voltage mode.

* * * * *